United States Patent [19]

Leibbrand et al.

[11] Patent Number: 5,272,634
[45] Date of Patent: Dec. 21, 1993

[54] ANTI-BLOCK SYSTEM FOR THE TWO DRIVEN WHEELS OF A VEHICLE

[75] Inventors: Norbert Leibbrand, Mühlacker; Gerhard Wieder, Besigheim, both of Fed. Rep. of Germany

[73] Assignee: Robert Bosch GmbH, Stuttgart, Fed. Rep. of Germany

[21] Appl. No.: 663,347

[22] PCT Filed: Sep. 20, 1989

[86] PCT No.: PCT/EP89/01089
§ 371 Date: Mar. 26, 1991
§ 102(e) Date: Mar. 26, 1991

[87] PCT Pub. No.: WO90/03291
PCT Pub. Date: Apr. 5, 1990

[30] Foreign Application Priority Data

Sep. 30, 1988 [DE] Fed. Rep. of Germany ....... 3833212

[51] Int. Cl.$^5$ ............................ B60T 8/66; B60T 8/76
[52] U.S. Cl. ................................ 364/426.02; 303/95; 303/105; 303/109
[58] Field of Search ...................... 364/426.01, 426.02, 364/426.03; 303/95, 97, 103, 105, 106, 98, 99, 109; 180/197

[56] References Cited

U.S. PATENT DOCUMENTS

| | | | |
|---|---|---|---|
| 4,526,426 | 7/1985 | Sato et al. | 303/105 X |
| 4,789,938 | 12/1988 | Maehata et al. | 364/426.02 |
| 4,802,711 | 2/1989 | Muto et al. | 364/426.02 X |
| 4,849,891 | 7/1989 | Krohn et al. | 364/426.03 |
| 4,860,847 | 8/1989 | Shiraishi et al. | 364/426.02 X |
| 4,870,638 | 10/1989 | Shiraishi et al. | 364/426.01 |
| 4,970,649 | 11/1990 | Matsuda | 364/426.02 |
| 4,991,910 | 2/1991 | Shimanuki et al. | 364/426.02 X |

*Primary Examiner*—Thomas G. Black
*Assistant Examiner*—Collin W. Park
*Attorney, Agent, or Firm*—Felfe & Lynch

[57] ABSTRACT

An anti-block system is described which contains a slip control for the purpose of which a reference value must be produced. The particular construction thereof, namely extrinsically to the control, is described.

6 Claims, 1 Drawing Sheet

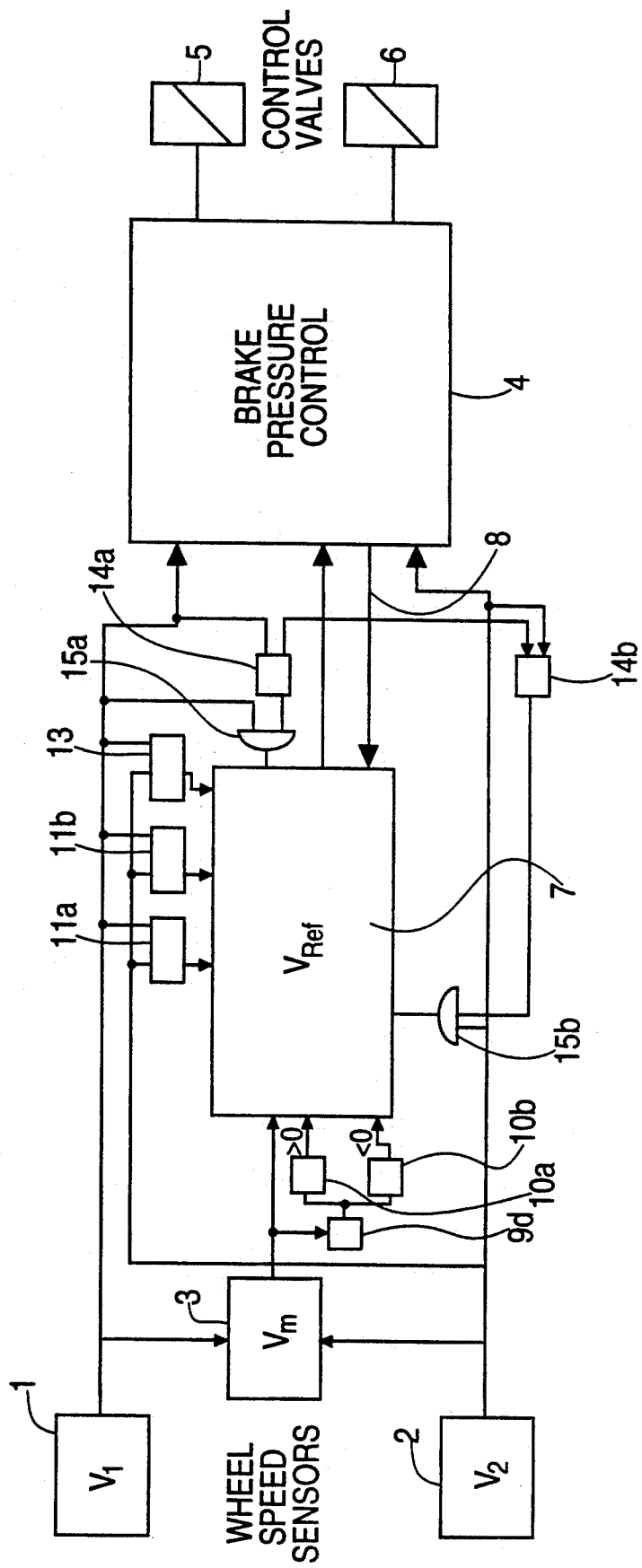

ANTI-BLOCK SYSTEM FOR THE TWO DRIVEN WHEELS OF A VEHICLE

BACKGROUND OF THE INVENTION

Anti-block systems (ABS) are known which have a slip control and produce for this purpose a reference value which approximates to the speed of the vehicle, the rise of which reference value is limited so as not to permit physically impossible changes of the vehicle speed to enter into the production of the reference value.

From EP-A2 0299 510 an anti-block system is known in which the vehicle speed is determined extrinsically to the control operation by the speed of the more rapidly rotating, undriven wheel.

In DE-AL 30 11 541 an arrangement for detecting the skidding or sliding of wheels of total adhesion locomotives is described. In this case the revolutions of the driven axles are detected and a pseudo-axle simulated by means of an integrator; the signal of the integrator serves as the reference value.

SUMMARY OF THE INVENTION

The invention, on the other hand, concerns the production of a reference value extrinsically to the brake pressure control in an ABS in which only the brake pressure on the driven wheels is controlled. The following advantages are achieved: When both wheels spin, the reference value rises only within the scope of what is physically possible—fast steep rises are impossible. When one wheel spins, the slower wheel determines the reference value. If one wheel slows down gradually, as occurs in so-called $\mu$-split conditions, the faster wheel keeps the reference value up and ensures that the slip control starts to operate. The reference value cannot drop steeply.

In addition a speed difference $V_D$ is predetermined. If the two wheel speeds differ by more than this difference (band), the state which existed at the time of departure from the band is maintained until the two wheel speeds have again approached each other.

The above exposition shows that in the invention great importance is attached to the production of the reference value extrinsically to the control. The reference value is in this case produced otherwise than during the ABS control. In the other case steeper gradients of its behaviour curve are permitted in order to accommodate higher wheel dynamics. The production of the reference during the control is for example as follows: after the occurrence of the instability ($-b$) the gradient is at first kept flat for a time, but a steep gradient is permitted for a speed reduction as well as for a speed increase.

An important aspect of the invention is to limit the production of the reference value in accordance with the criteria applied during the ABS control to this period of the control, without degrading the ABS control behaviour.

BRIEF DESCRIPTION OF THE DRAWING

The sole figure is a diagram of the anti-skid system.

DETAILED DESCRIPTION OF THE PREFERRED EMBODIMENT

In the drawing the two driven wheels of a motor vehicle are provided with sensors 1 and 2 for the purpose of determining the wheel speed. The mean value $$V_m = \frac{V_1 + V_2}{2}$$

is produced in a block 3 from the two wheel speed signals. The wheel speed signals are also transmitted to a microprocessor 4 which produces slip signals, but also for example wheel deceleration signals, and produces brake pressure control signals for the brake pressure control valves 5 and 6 appertaining to the drive wheels, in dependence on the kinetic behaviour of the wheels.

A reference value $V_{Ref}$ approximating the behaviour of the vehicle velocity is required to produce the slip signals. This production takes place in a block 7.

As previously mentioned, the production of the reference value ensues differently, depending on whether the brake pressure control has started to operate i.e., whether or not a reduction in brake pressure has occurred. This is imparted to the block 7 from the microprocessor 4 by way of a line 8. As long as the ABD control has not yet started to operate, the positive gradients of the reference value are determined by the mean wheel speed $V_m$, for which purpose the speed signal $V_m$ is transmitted to the block 7.

If on the other hand it is recorded through line 8 that the control has started to operate, the reference speed is produced as follows.

The block 7 contains a limit for the reference rise: If the rise attains a value which is to be regarded as physically impossible for the vehicle, the value is limited to the maximum possible value. Different maximum rises of which the vehicle is capable in the course of maximum acceleration can be allocated to different speed ranges. This limitation comes into effect when both wheels spin. On the other hand, when only one wheel deviates the amount of the reference value is determined respectively by a wheel speed signal, namely by that of the wheel rotating more slowly when $dV_m/dt > 0$ (i.e. when the vehicle accelerates and a wheel spins), and by that of the wheel rotating more rapidly when $dV_m/dt < 0$ (drop of speed of a wheel). For this purpose the signal $V_m$ is differentiated in a differentiator 9d and its output signal is transmitted by way of threshold steps 10a and 10b ($>0$; $<0$) to the block 7. In addition the larger of the two wheel signals is selected in a block 11a and the smaller in a block 11b and transmitted to the block 7, so that one of these signals can be used there to provide the basis for the reference value.

A further block 13 produces a signal when the signals $V_1$ and $V_2$ are apart by a predetermined value $V_D$ (threshold). If this occurs, the immediate existing state (the faster or the slower wheel provides the basis for the reference value) is maintained until the value again falls below the threshold $V_D$ or the control starts to operate.

If at the start of the control operation one wheel signal is above the reference value by more than a predetermined amount, this is determined in a comparator 14a or 14b. The output signal of these then blocks the transmission of the signal to block 7 by means of an AND-gate 15a or 15b, and thus prevents this signal from entering into the production of the reference value.

We claim:

1. Anti-lock braking system for a vehicle having two driven wheels, said system comprising means for determining the speeds of the two driven wheels including a maximum speed and a minimum speed, means for determining a difference between said speeds of said driven wheels, means for determining a mean speed value $V_M$ of the two driven wheels, means for determining a gradient $dV_M/dt$ of said mean value $V_M$, control means for reducing brake pressure at each said driven wheel when the speed of said wheel falls below a reference value by a predetermined slip, means for determining said reference value solely from said minimum speed when said control means is not operating and $dV_M/dt>0$, and when as long as said difference exceeds a predetermined value $V_D$ after $dV_M/dt>0$, means for determining said reference value solely from said maximum speed when said control means is operating and $dV_M/dt<0$, and when and as long as said difference exceeds a predetermined value $V_D$ after $dV_M/dt<0$, means for limiting any increase in said reference value to $dV_M/dt$, and means for limiting $d/V_M/dt$ to a maximum possible acceleration.

2. Antilocking system as in claim 1 further comprising means for determining said maximum possible acceleration in dependence upon said reference value.

3. Anti-lock braking system as in claim 1 further comprising means for comparing each said wheel speed to a threshold value when said control means is reducing pressure at either said driven wheel, and means for excluding a wheel speed which exceeds said threshold from determining said reference value.

4. Method for controlling brake pressure in a vehicle having two driven wheels, said method comprising determining the speeds of the two driven wheels including a maximum speed and a minimum speed, determining a difference between said speeds of said driven wheels, determining a mean speed value $V_M$ of the two driven wheels, determining a gradient $dV_M/dt$ of said means value $V_M$, controlling brake pressure at each said driven wheel when the speed of said wheel falls below a reference value by a predetermined slip, determining said reference value solely from said minimum speed when said brake pressure is not being controlled at either driven wheel and $dV_M/dt>0$, and when and as log as said difference exceeds a predetermined value $V_D$ after $dV_M/dt>0$, determining said reference value solely from said maximum speed when said brake pressure is not being controlled at either driven wheel and $dV_M/dt<0$, and when and as long as said difference exceeds a predetermined value $V_D$ after $dV_M/dt<0$, limiting any increase in said reference value to $dV_M/dt$, and limiting $dV_M/dt$ to a maximum possible acceleration.

5. Method as in claim 4 further comprising determining said maximum possible acceleration in dependence upon said reference value.

6. Method as in claim 4 further comprising comparing each said wheel speed to a threshold value when brake pressure is being reduced at either said driven wheel, and excluding a wheel speed which exceeds said threshold value from determining said reference value.

* * * * *